(12) United States Patent
Sun (10) Patent No.: US 8,254,441 B2
(45) Date of Patent: Aug. 28, 2012

(54) VIDEO STREAMING BASED UPON WIRELESS QUALITY

(75) Inventor: Yaojun Sun, South Riding, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1045 days.

(21) Appl. No.: 12/193,103

(22) Filed: Aug. 18, 2008

(65) Prior Publication Data

US 2010/0040134 A1   Feb. 18, 2010

(51) Int. Cl.
*H04B 1/66* (2006.01)

(52) U.S. Cl. .............................. 375/240.01; 375/240.27

(58) Field of Classification Search ......................... None
See application file for complete search history.

(56) References Cited

U.S. PATENT DOCUMENTS

| | | | |
|---|---|---|---|
| 6,839,080 B2 | 1/2005 | Meyers | |
| 7,003,033 B2 | 2/2006 | Kim et al. | |
| 7,343,157 B1 | 3/2008 | Mitchell | |
| 2002/0080873 A1* | 6/2002 | Yoo .......................... | 375/240.01 |
| 2003/0009576 A1 | 1/2003 | Apostolopoulos et al. | |
| 2003/0122924 A1 | 7/2003 | Meyers | |
| 2004/0106434 A1 | 6/2004 | Shibasaki | |
| 2005/0143013 A1 | 6/2005 | Jha | |
| 2006/0026302 A1 | 2/2006 | Bennett et al. | |
| 2006/0031387 A1 | 2/2006 | Hamzeh et al. | |
| 2006/0133318 A1 | 6/2006 | Jung et al. | |
| 2006/0218264 A1* | 9/2006 | Ogawa et al. .................. | 709/223 |
| 2007/0047443 A1 | 3/2007 | Desai et al. | |
| 2007/0195886 A1* | 8/2007 | Sakamoto ................ | 375/240.18 |
| 2008/0069002 A1* | 3/2008 | Savoor et al. .................. | 370/241 |
| 2008/0141091 A1* | 6/2008 | Kalluri ........................... | 714/748 |
| 2008/0152003 A1* | 6/2008 | Oguz ........................ | 375/240.12 |
| 2009/0268821 A1* | 10/2009 | Au et al. .................. | 375/240.16 |

FOREIGN PATENT DOCUMENTS

| | | |
|---|---|---|
| EP | 1341336 | 9/2003 |
| EP | 1725038 | 11/2006 |
| WO | 02052860 | 7/2002 |

\* cited by examiner

*Primary Examiner* — Phirin Sam

(57) ABSTRACT

What is disclosed is a method of operating a video system. The method includes, in a video server, monitoring a quality indicator for wireless communications between a wireless communication system and a wireless communication device, transferring reference frames of a video for delivery to the wireless communication device over the wireless communication system if the quality indicator indicates a particular quality level and stopping the transfer of the reference frames if the quality indicator does not indicate the particular quality level, and transferring update frames of the video for delivery to the wireless communication device over the wireless communication system without regard to whether the quality indicator indicates the particular quality level. The method also includes, in the wireless communication device, receiving the reference frames and the update frames of the video over the wireless communication system, and displaying the video.

18 Claims, 9 Drawing Sheets

VIDEO STREAMING BASED UPON WIRELESS QUALITY

TECHNICAL FIELD

Aspects of the embodiments are related to the field of communications, and in particular, to streaming video over wireless communication networks.

TECHNICAL BACKGROUND

Wireless communication networks typically include wireless communication devices which, via a wireless communication system, communicate with further communication networks and equipment. The wireless communication system typically includes equipment to route communications over wireless links from the wireless communication devices to further communication networks, equipment, and destinations.

Some examples of wireless communication networks allow wireless communication devices to access video content held on video systems through the wireless communication system. These video systems transfer video content to the wireless communication devices utilizing the wireless communication network. However, video content many times requires consistently high wireless communication bandwidths and relatively strong wireless signals to support the higher bandwidth video content.

Unfortunately, if a wireless communication device is located in a place of poor wireless coverage, or moving through areas of varying wireless coverage, for example, the video content may also suffer and be degraded or experience interruptions in playback. This can lead to a poor user experience due to jumpy or sporadic video content performance.
Overview What is disclosed is a method of operating a video system. The method includes, in a video server, monitoring a quality indicator for wireless communications between a wireless communication system and a wireless communication device, transferring reference frames of a video for delivery to the wireless communication device over the wireless communication system if the quality indicator indicates a particular quality level and stopping the transfer of the reference frames if the quality indicator does not indicate the particular quality level, and transferring update frames of the video for delivery to the wireless communication device over the wireless communication system without regard to whether the quality indicator indicates the particular quality level. The method also includes, in the wireless communication device, receiving the reference frames and the update frames of the video over the wireless communication system, and displaying the video.

What is also disclosed is another method of operating a video system. The method includes, in a video server, receiving a request for a video from a wireless communication device over a wireless communication system, requesting a quality indicator from a base station associated with the wireless communication device, wherein the quality indicator indicates a quality of wireless communications between the wireless communication device and the wireless communication system, requesting the video from a media storage system. The method also includes, in the media storage system, processing the request for the video and transferring the video to the video server. The method also includes, in the video server, monitoring the quality indicator and transferring reference frames of the video for delivery to the wireless communication device over the wireless communication system if the quality indicator indicates a particular quality level and stopping the transfer of the reference frames if the quality indicator does not indicate the particular quality level, and transferring update frames of the video for delivery to the wireless communication device over the wireless communication system without regard to whether the quality indicator indicates the particular quality level.

What is also disclosed is a communication system. The communication system includes a wireless communication device and a wireless communication system configured to exchange wireless communications, where the wireless communication system is configured to receive a request from the wireless communication device for a video and transfer the request for the video to a video server. The video server is configured to receive the request for the video, monitor a quality indicator of the wireless communications, and transfer reference frames of the video for delivery to the wireless communication device over the wireless communication system if the quality indicator indicates a particular quality level, and stop the transfer of the reference frames if the quality indicator does not indicate the particular quality level. The video server is also configured to transfer update frames of the video for delivery to the wireless communication device over the wireless communication system without regard to whether the quality indicator indicates the particular quality level. The wireless communication device is configured to receive the video, process the reference frames and the update frames to determine a playback sequence of the video, and display the video in the playback sequence.

What is also disclosed is a wireless communication device. The wireless communication device includes a communication interface configured to exchange wireless communications with a wireless communication system over a wireless link, wherein the wireless link comprises a first logical transport link and a second logical transport link and a processing system configured to determine a quality indicator of the wireless communications with the wireless communication system. The communication interface is configured to transfer the quality indicator and a request for a video over the wireless link, receive reference frames of the video over the first logical transport link, and receive update frames of the video over the second logical transport link. The processing system is configured to receive the reference frames and the update frames, and determine a playback sequence of the video among the reference frames and the update frames. A display system is configured to display the reference frames and the update frames in the playback sequence.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
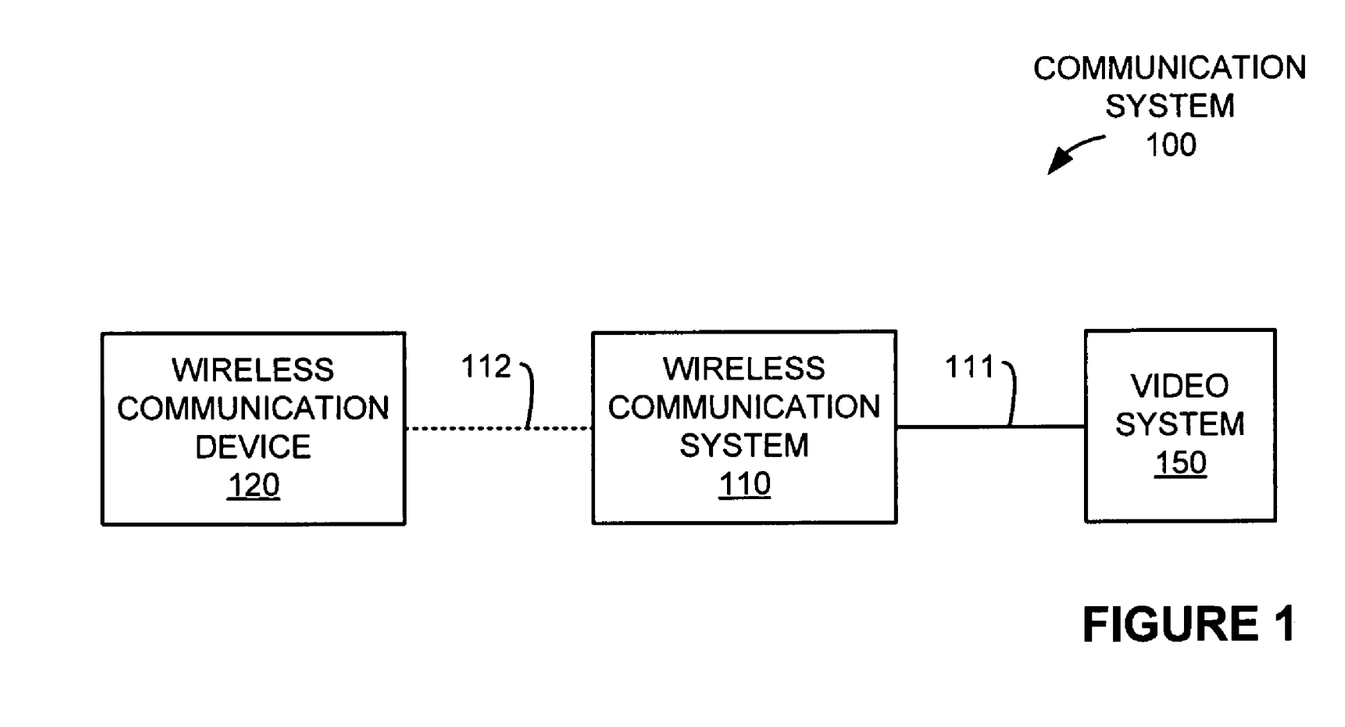
FIG. 1 is a system diagram illustrating a communication system.

FIG. 1 is a system diagram illustrating communication system 100. Communication system 100 includes wireless communication device 120, wireless communication system 110, and video system 150. Wireless communication device 120 and wireless communication system 110 communicate over wireless link 112. Video system 150 and wireless communication system 110 communicate over link 111.

Wireless communication device 120 comprises a telephone, transceiver, computer, digital assistant, smart phone, Internet appliance, or some other wireless communication apparatus—including combinations thereof.

Video system 150 could be any type of equipment capable of serving or streaming video to wireless communication device 120. Examples of video system 150 include video servers, media storage systems, video controllers, computers, processing systems, storage-area networks, network-attached storage systems, or other equipment—including combinations thereof.

Wireless communication system 110 can be any type of wireless communications network equipment capable of communicating with wireless communication device 120. Examples of wireless communication system 110 include base stations, base transceiver stations, antennas, radio node controllers (RNC), mobile switching controllers, call processing equipment, wireless access points, telephone switches, Internet routers, network gateways, as well as other type of communication equipment—including combinations thereof.

Wireless link 112 uses various communication media, such as air, space, or some other wireless transport media—including combinations thereof. Wireless link 112 uses various protocols, such as worldwide interoperability for microwave access (WiMAX), long-term evolution (LTE), wireless fidelity (WiFi), code division multiple access (CDMA), Global System for Mobile communications (GSM), or some other communication format—including combinations or variations thereof.

Wireless link 112 may comprise many different signals sharing the same link. Wireless link 112 could include multiple signals operating in a single "airpath"—as represented by the dashed line in FIG. 1—comprising multiple frequencies, timeslots, transportation ports, logical transport links, sockets, packets, or communication directions. For example, communications and control signals between wireless communication device 120 and wireless communication system 110 could share the same wireless link 112, but be transferred over different frequencies, timeslots, packets, ports, sockets, logical transport links, or in different directions—including combinations thereof. In some examples, a logical transport link indicates a logical link at the application layer in a network hierarchy of the communication protocol employed. Examples of transportation ports include Transmission Control Protocol (TCP) ports, User Datagram Protocol (UDP) ports, or other transportation ports.

Link 111 uses various communication media, such as air, space, metal, optical fiber, or some other signal propagation path—including combinations thereof. Link 111 could be wired or wireless and use various communication protocols such as Internet, Internet protocol (IP), local-area network (LAN), optical networking, hybrid fiber coax (HFC), telephony, T1, or some other communication format—including combinations or variations thereof. Link 111 could be a direct link or might include various equipment, intermediate components, systems, and networks. Link 111 could include multiple signals operating in a single pathway in a similar manner as link 112.

Figure 2:
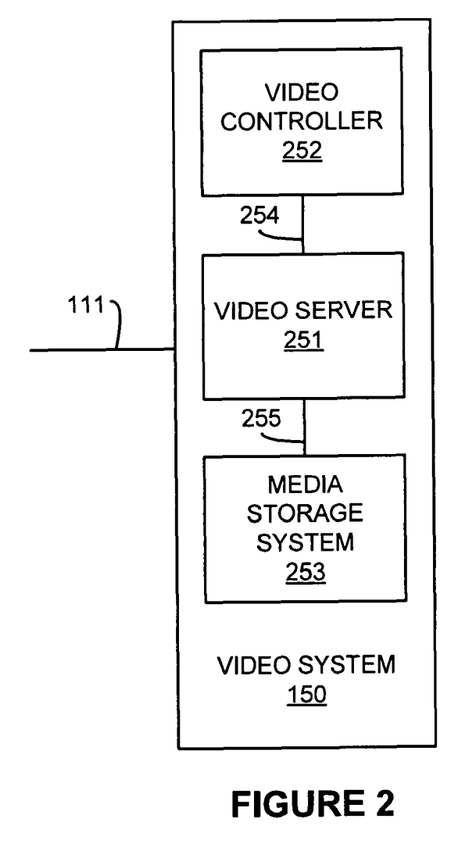
FIG. 2 is a block diagram illustrating an example of a video system.

FIG. 2 is a block diagram illustrating an example of video system 150. Video system 150, in this example, includes video server 251, video controller 252, and media storage system 253. Video server 251 and video controller 252 are communicatively linked by link 254. Video server 251 and media storage system 253 are communicatively linked by link 255.

Video server 251 includes processing systems, file servers, video streaming systems, computer systems, or other video serving or streaming equipment, including combinations thereof.

Video controller 252 includes equipment for controlling the operations of video server 251. Video controller 252 could incorporate a computer microprocessor, circuitry, or some other processing device or software system, and may be distributed among multiple processing devices. In some examples, video controller 252 is located within the same equipment in which video server 251 is located. Video controller 252 may also include software such as an operating system, logs, utilities, drivers, networking software, and other software which is typically stored on a computer-readable medium.

Media storage system 253 comprises a storage system for storing audio-visual media, such as video, images, and other related content. Media storage system 253 could include a computer-readable medium such as a disk, tape, integrated circuit, server, or some other memory device, and also may be distributed among multiple memory devices. In some examples, media storage system 253 comprises a storage-area network (SAN) or network-attached storage (NAS) system which stores a large collection of videos for access over a network interface. In other examples, media storage system 253 could be a temporary buffer system which facilitates the transfer of live video to video server 251.

Links 254-255 comprise physical, logical, or virtual communication links, capable of communicating video data, control signals, along with other information. In some examples, links 254-255 are encapsulated within the elements of video server 251, video controller 252, or media storage system 253 and may be a software or logical link. Links 254-255 use various communication media, such as air, space, metal, optical fiber, or some other signal propagation path—including combinations thereof. Links 254-255 could be wired or wireless and use various communication protocols such as Internet, Internet protocol (IP), local-area network (LAN), optical networking, hybrid fiber coax (HFC), telephony, T1, or some other communication format—including combinations or variations thereof. Links 254-255 could be a direct links or might include various equipment, intermediate components, systems, and networks.

Figure 3:
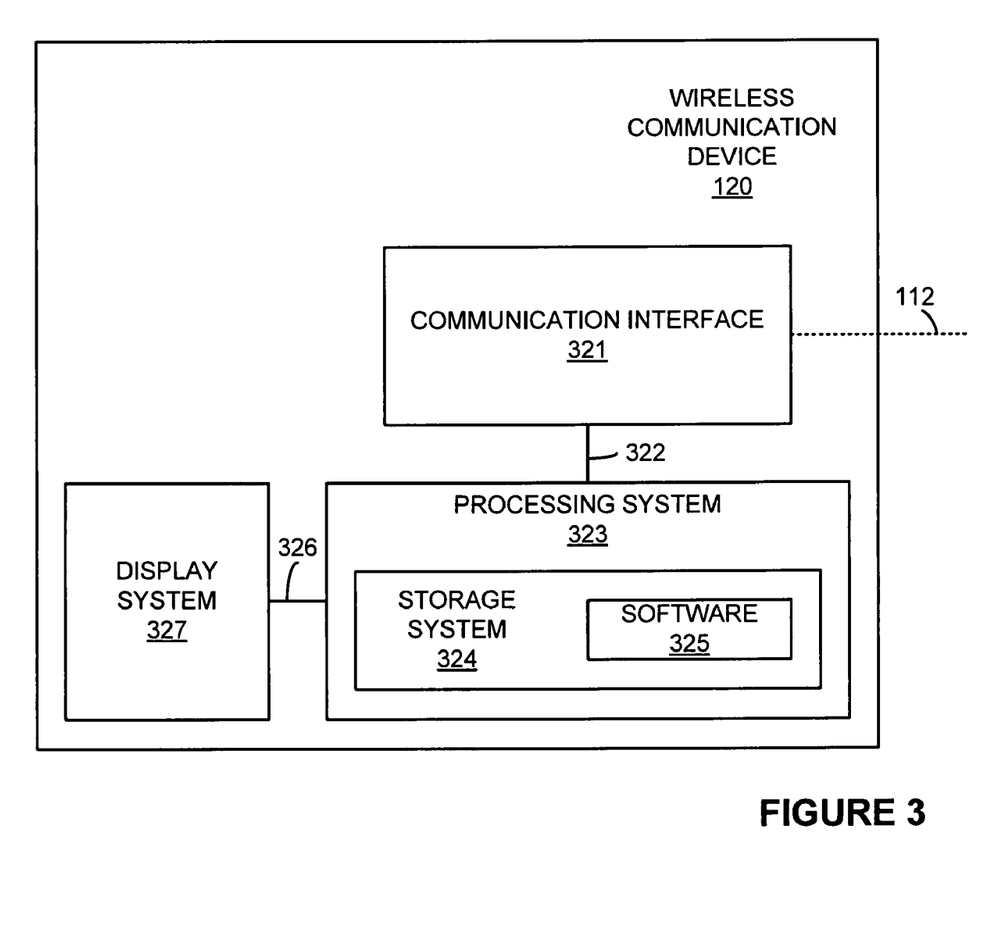
FIG. 3 is a block diagram illustrating an example of a wireless communication device.

FIG. 3 illustrates a block diagram of an example of wireless communication device 120. Wireless communication device 120, in this example, includes communication interface 321, processing system 323, and display system 327. Processing system 323 includes storage system 324. Storage system 324 stores software 325, which includes data to be retrieved and instructions to be executed by processing system 323 to perform the various functions described herein. Processing system 323 is communicatively linked to communication interface 321 by link 322. Processing system 323 is communicatively linked to display system 327 by link 326. Wireless communication device 120 may be distributed among multiple devices that together form elements 321-327.

Communication interface 321 comprises antennas, transceivers, circuitry, as well as other types of communication components—including combinations thereof.

Processing system 323 retrieves and executes software 325 from storage system 324. Processing system 323 could incorporate a computer microprocessor, logic circuit, or some other processing device, and may be distributed among multiple processing devices. In some examples, processing system 323 is located within the same equipment in which communication interface 321 or display system 327 are located. Storage system 324 could include a computer-readable medium such as a disk, tape, integrated circuit, server, or some other memory device, and also may be distributed among multiple memory devices. Software 325 may include an operating system, logs, utilities, drivers, networking software, and other software typically loaded onto a computer system. Software 325 could contain an application program, firmware, or some other form of computer-readable processing instructions. When executed by processing system 323, software 325 directs processing system 323 to operate as described herein.

Display system 327 includes circuitry and a viewscreen or user display used for viewing video content on wireless communication device 120. In some examples, display system 327 includes a viewscreen integrated into wireless communication device 120, while in other examples, display system 327 may include an interface to a display system external to wireless communication device 120.

Links 322 and 326 comprise physical, logical, or virtual communication links, capable of communicating data, control signals, and communications, along with other information. In some examples, links 322 and 326 are encapsulated within the elements of communication interface 321, processing system 323, or display system 327 and may be a software or logical link. In other examples, links 322 and 326 use various communication media, such as air, space, metal, optical fiber, or some other signal propagation path—including combinations thereof. Links 322 and 326 could be wired or wireless and use various protocols or communication formats as described herein for wireless link 112—including combinations or variations thereof. Links 322 and 326 could be a direct link or it might include various equipment, intermediate components, systems, and networks.

Figure 4:
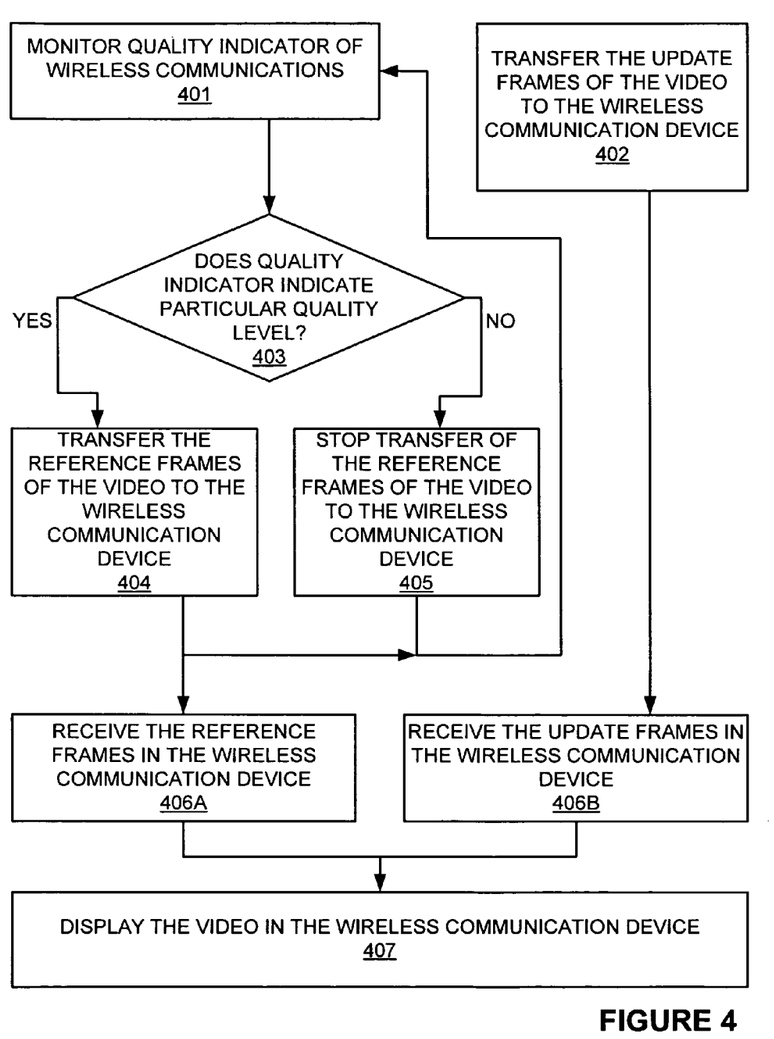
FIG. 4 is a flow diagram illustrating a method of operation of a video system.

FIG. 4 is a flow diagram that illustrates a method of operation of video system 150, as found in FIG. 1. The phases shown in FIG. 4 are indicated herein parenthetically. In FIG. 4, video system 150 monitors (401) a quality indicator of wireless communications between wireless communication device 120 and wireless communication system 110.

The quality indicator indicates a quality of wireless communications between wireless communication device 120 and wireless communication system 110. In some examples, quality indicator indicates a signal-to-noise ratio of the wireless communications with wireless communication device 120 at wireless communication system 110 or at wireless communication device 120. In other examples, the quality indicator comprises an RF signal quality, such as signal strength or noise level, of the wireless communications. In yet other examples, the quality indicator comprises a present bandwidth of the wireless communications. In addition to a quality indicator of wireless communications, other factors may also be monitored. For example, a service-level agreement (SLA) for a user of wireless communication device 120 may dictate differing levels of bandwidth, bit rates, or quality-of-service (QoS) allotted to the user. These SLA concerns could be considered and monitored along with the quality indicator.

In some examples, video system 150 requests the quality indicator from wireless communication system 110, possibly from a base station associated with wireless communication device 120. In other examples, video system 150 receives the quality indicator from wireless communication device 120. In examples where more than one base station is located within wireless communication system 110, video system 150 must first determine from which base station to request the quality indicator. Video system 150 could further query another system in wireless communication system 110 to obtain an indicator as to which base station is associated with wireless communication device 120.

Video system 150 then determines (403) if the quality indicator indicates a particular quality level. If the quality indicator does indicate a particular quality level, video system 150 transfers (404) reference frames of a video to wireless communication device over wireless communication system 110. However, if the quality indicator does not indicate a particular quality level, then video system 150 stops (405) transfer of the reference frames of the video to wireless communication device 120. The particular quality level, in some examples, comprises a threshold level of an RF signal quality, such as signal strength or noise level, of the wireless communications. In yet other examples, the particular quality level comprises a threshold bandwidth level of the wireless communications. The SLA as mentioned above could also factor into the particular quality level, and impact a possible threshold.

Video system 150, concurrently, and without regard to the quality indicator mentioned above, transfers (402) update frames of the video to wireless communication device 120.

Wireless communication device 120 receives (406A) the reference frames of the video when transferred by video system 150. Wireless communication device 120 also receives (406B) the update frames of the video transferred from video system 150. Wireless communication device 120 then displays (407) both the reference frames and the update frames. Since the reference frames may be received in a different sequence with respect to the update frames, wireless communication device 120 may need to process the reference frames and the update frames and determine a playback sequence. In some examples, wireless communication device 120 stores the update frames in a buffer or cache while awaiting reference frames. As the reference frames are received, the update frames can then be transferred from the buffer and displayed in the correct sequence with the reference frames. The relationship between reference frames and update frames are illustrated in FIG. 5, and discussed below.

During operation of video system 150, the process described above in phases 401 and 403-406 may be repeated throughout the transfer of a video. How frequently video system 150 monitors (401) the status of the quality indicator will vary depending upon many factors, including the intentions of the operator of video system 150, the quality of video desired to be transferred, the SLA of the user of wireless communication device 120, among other factors.

Figure 5:
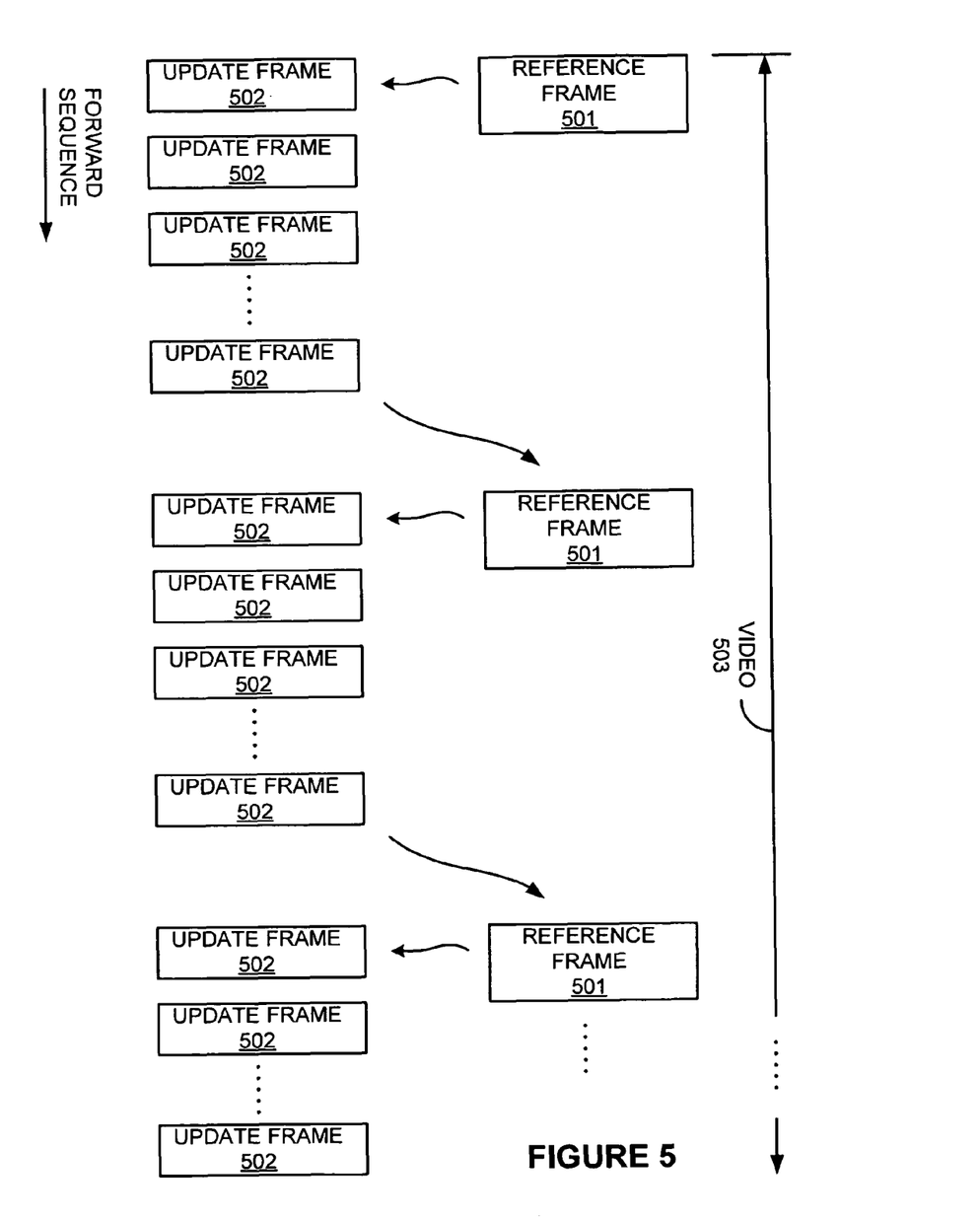
FIG. 5 is a diagram illustrating a sequence of reference frames and update frames of a video.

FIG. 5 is a diagram illustrating a sequence of reference frames 501 and update frames 502 of video 503. Video 503 is comprised of several frames, or time-correlated image elements of a video. These frames, when accumulated in a sequence, correspond to a portion of video 503. In many examples of video 503, several frames are used to comprise one portion, such as one second, of video 503. The length of time of video 503 could be predetermined, as in the example of a fixed-length movie, or could be open-ended, as in the case of streaming newscast or sporting event which may continue indefinitely.

In some examples, such as shown in FIG. 5, reference frame types 501 and update frame types 502 comprise a portion of video 503. Each reference frame 501 is typically a frame type used as a reference or key for an update frame 502. Update frames 502 indicate a change, difference, or delta in the previous frame in a sequence of frames. In many typical examples, reference frames 501 contain much more data than update frame 502, and likewise require much more bandwidth to transfer.

In FIG. 5, reference frames 501 precede a series of update frames 502. Each update frame 502 indicates a change to the previous frame, whether the previous frame is a reference frame 501 or another update frame 502. Several update frames 502 can follow a particular reference frame 501, depending upon the video format used. In some example formats, each reference frame 501 occurs once for every ½ second of video 503, with update frames 502 occurring when a reference frame 501 does not, to establish a total frame rate of 24 or 30 frames per second of video 503. In other examples, more or less frames of each type could comprise each second of video 503.

Reference frames 501 include information relating to an entire visible frame of video, typically comprising enough data to complete an image or picture encompassing the entire viewable portion or scene of a video. This is in contrast to update frames 502, which typically include only a subset of the information that encompasses the entire viewable portion of a video. As mentioned above, the update frames 502 indicate a change from a neighboring frame, where the neighboring frame could be either a reference frames 501 or update frames 502. In this manner, each update frame 502 need only contain a smaller amount of data than a reference frame 501. For example, a video containing a person walking past an unchanging or slowly changing background would typically require the update frames 502 to include information changing from one frame to the next (i.e. information relating to the motion of the person), whereas the reference frames 502 would typically include information encompassing the entire viewable portion of the video (i.e. information relating to the person and the background).

In addition to containing image data, reference frames 501 and update frames 502 can also contain sequencing information relating to a display order and a transmit order. However, a reference frame must be displayed first in order for subsequent update frames 502 to have a baseline or key from which a delta or change can be determined. In many examples, video 503 can be displayed in forward sequence or reverse sequence through a similar use of reference frames 501 and update frames 502.

In examples of compressed video, such as MPEG video, reference frames 501 can include a frame type referred to as intra-frames (I frames), whereas update frames 502 can include several frame types referred to as predicted (P frames) or bidirectional frames (B frames). Several examples variants of MPEG video exist, such as MPEG-1, MPEG-2, or MPEG-4, each incorporating similar principles as discussed herein. Other example video formats include QuickTime, DivX, VCEG, H.264, Windows Media Video (WMV), Ogg Theora, or other compressed video formats, which may follow similar frame utilization principles as found in MPEG.

Figure 6:
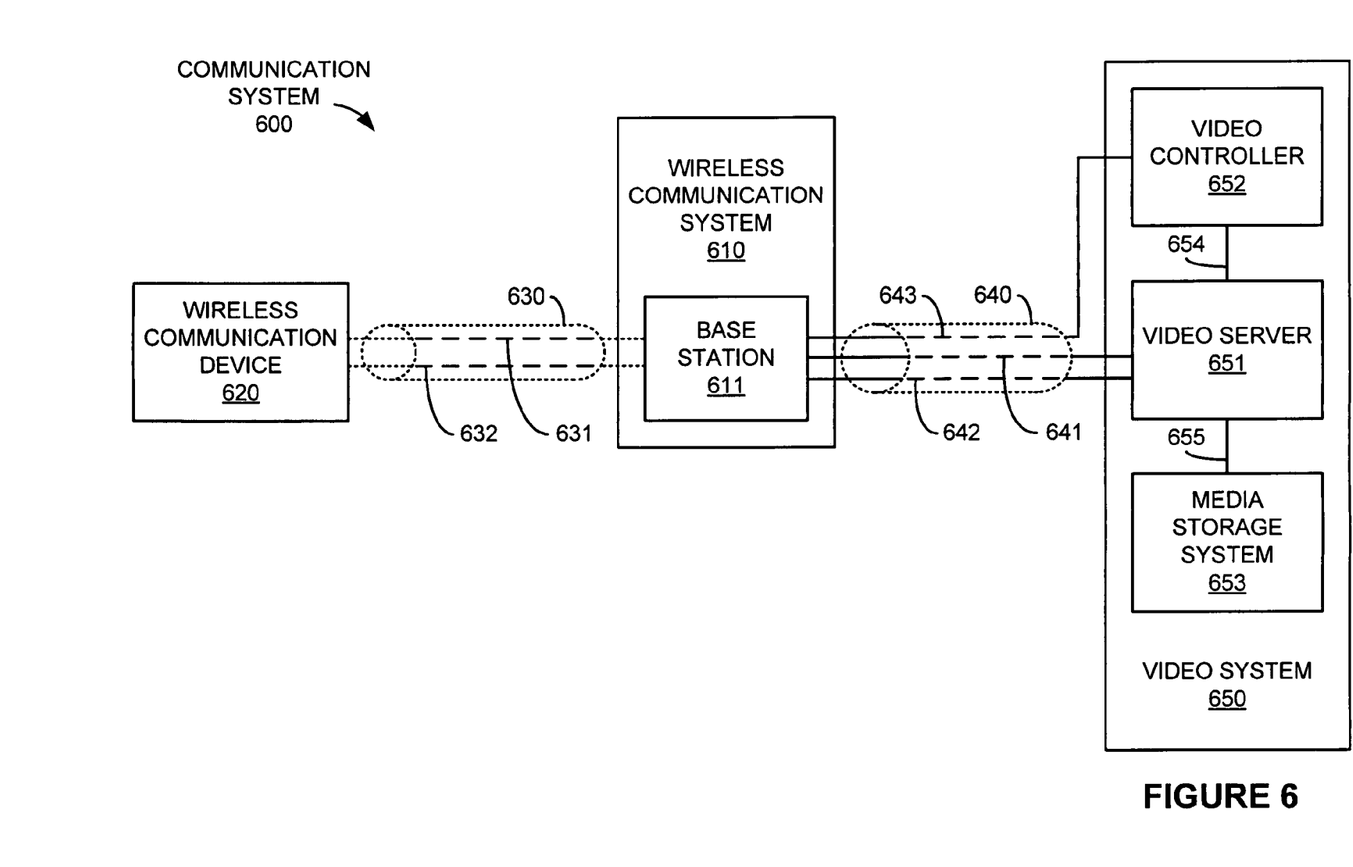
FIG. 6 is a system diagram illustrating a communication system.

FIG. 6 is a system diagram illustrating communication system 600. Communication system 600 includes wireless communication device 620, wireless communication system 610, and video system 650. Wireless communication device 620 and wireless communication system 610 communicate over wireless link 630. Video system 650 and wireless communication system 610 communicate over link 640. Wireless link 630 includes logical transport links 631-632. Link 640 includes logical transport links 641-643.

Wireless communication device 620 comprises a smart phone capable of displaying video in this example. Wireless communication system 610 can be any type of wireless communications network equipment capable of communicating with wireless communication device 620. As shown in FIG. 6, wireless communication system 610 includes base station 611. In other examples, a different number of wireless communication devices and base stations may be located in communication system 600. In examples where more than one base station is located in wireless communication system 610, wireless communication system 610 could also include equipment used to indicate which base station is associated with each wireless communication device.

Video system 650 includes equipment capable of transferring or streaming video to wireless communication device 620. As shown in FIG. 6, video system 650 comprises video server 651, video controller 652, and media storage system 653. Video server 651 and video controller 652 are communicatively linked by link 654. Video server 651 and media storage system 653 are communicatively linked by link 655. In some examples, video controller 652, media storage system 653, or links 654-655 are located within the same equipment in which video server 651 is located.

Video server 651 includes a data server for transferring video frames over wireless communication system 610 to wireless communication device 620. Video controller 652 includes equipment for controlling the operations of video server 651, and comprises a computer system. Media storage system 653 comprises a storage system for storing video frames and related content. In this example, media storage system 653 comprises a storage-area network (SAN) which stores a large collection of videos.

Links 654 and 655 comprise IP network links between video server 651 and video controller 652, and video server 651 and media storage system 653, respectively. Link 640 comprises a T1 connection between video system 650 and wireless communication system 610. Wireless link 630 uses the long-term evolution (LTE) protocol to exchange communications between wireless communication device 620 and wireless communication system 610.

Wireless link 630 and link 640 may comprise many different signals sharing the same link. As shown in FIG. 6, wireless link 630 and link 640 include several logical transport links. Wireless link 630 includes logical transport links 631-632. Link 640 includes logical transport links 641-643. In this example, these logical transport links indicate routes between different transportation ports on the associated equipment.

Figure 7:
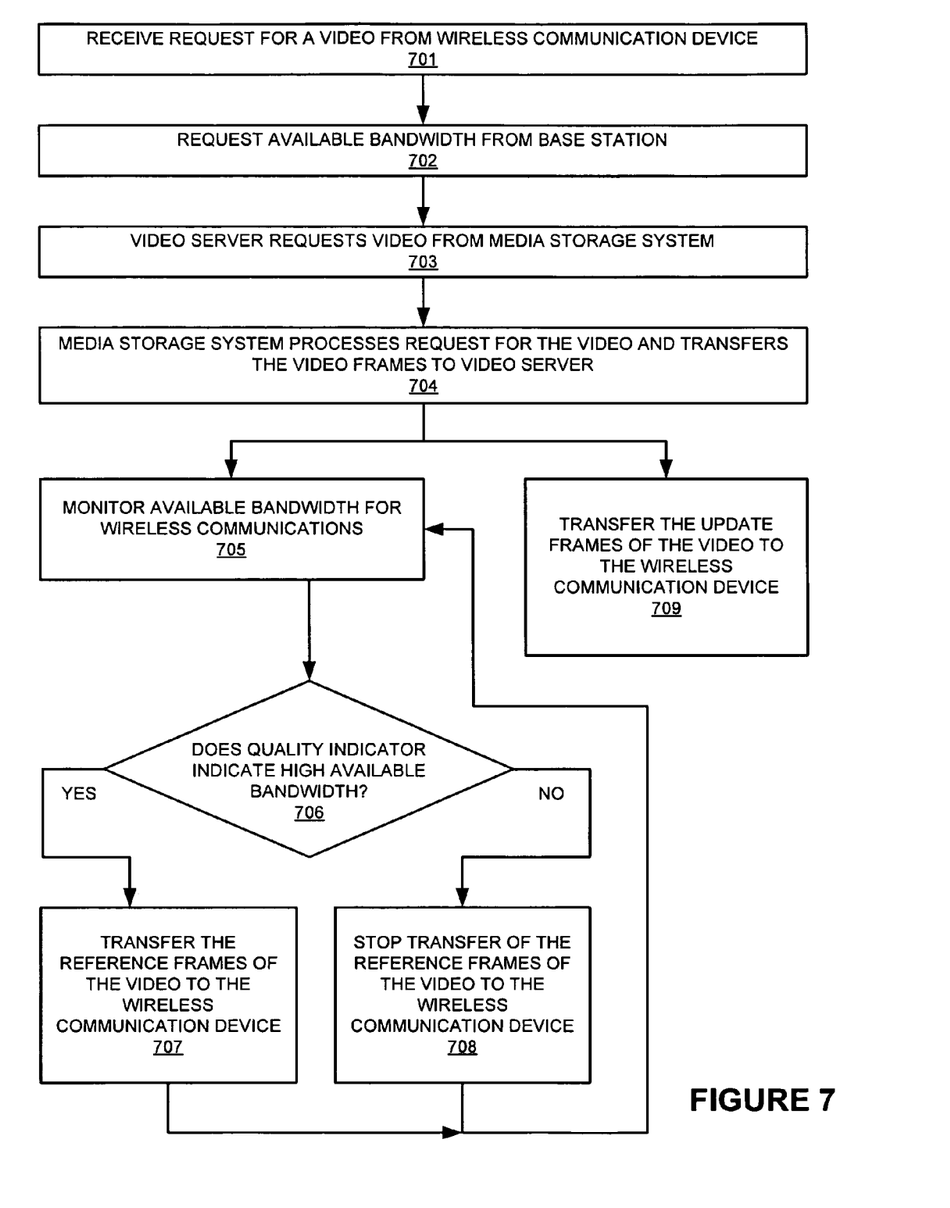
FIG. 7 is a flow diagram illustrating a method of operation of a communication system.

FIG. 7 is a flow diagram that illustrates a method of operation of communication system 600, as found in FIG. 6. The phases shown in FIG. 7 are indicated herein parenthetically. In FIG. 7, video server 651 or video controller 652 receives (701) a request for a video from wireless communication device 620.

Video controller 652 then requests (702) a quality indicator. In this example, video controller 652 requests this quality indicator from base station 611 over logical transport link 643. The quality indicator indicates a quality of wireless communications between wireless communication device 620 and wireless communication system 610. In this example, the quality indicator denotes a presently available bandwidth for wireless communications over wireless link 630.

In examples where more than one base station is located within wireless communication system 610, video controller 652 must first determine from which base station to request the quality indicator. Video controller 652 could query another system in wireless communication system 610 to obtain an indicator as to which base station is associated with wireless communication device 620.

Video server 651 then requests (703) the video, as requested by wireless communication device 620, from media storage system 653. Media storage system 653 processes (704) the request for the video and begins to transfer the frames of the video to video server 651 over link 655.

Video controller 652 monitors (705) the quality indicator of the wireless communications. Video controller 652 then determines (706) if the quality indicator indicates a particular quality level, or in this example, a particular available bandwidth. If the quality indicator indicates a desired level, i.e. high enough bandwidth, available for wireless communications over wireless link 630, then video server 651 transfers (707) reference frames of a video to wireless communication device 620 over wireless communication system 610 through base station 611. The reference frames are transferred over logical transport link 641 between video server 651 and base station 611, and over logical transport link 631 between base station 611 and wireless communication device 620. However, if the quality indicator does not indicate a high enough bandwidth available for wireless communications over wireless link 630, then video server 651 stops (708) transfer of the reference frames of the video to wireless communication device 620.

Video server 651, concurrently, and without regard to the quality indicator mentioned above, transfers (709) update frames of the video to wireless communication device 620. Update frames are transferred over logical transport link 642 between video server 651 and base station 611, and over logical transport link 632 between base station 611 and wireless communication device 620.

During operation of communication system 600, the process described above in phases 702 and 705-708 may be repeated throughout the transfer of a video. How frequent video controller 652 checks the status of the quality indicator will vary depending upon many factors, including the intentions of the operator of video system 650, the quality of video desired to be transferred, the service level agreement (SLA) between the user of wireless communication device 620 and the operator of wireless communication system 610, or other factors.

Figure 8:
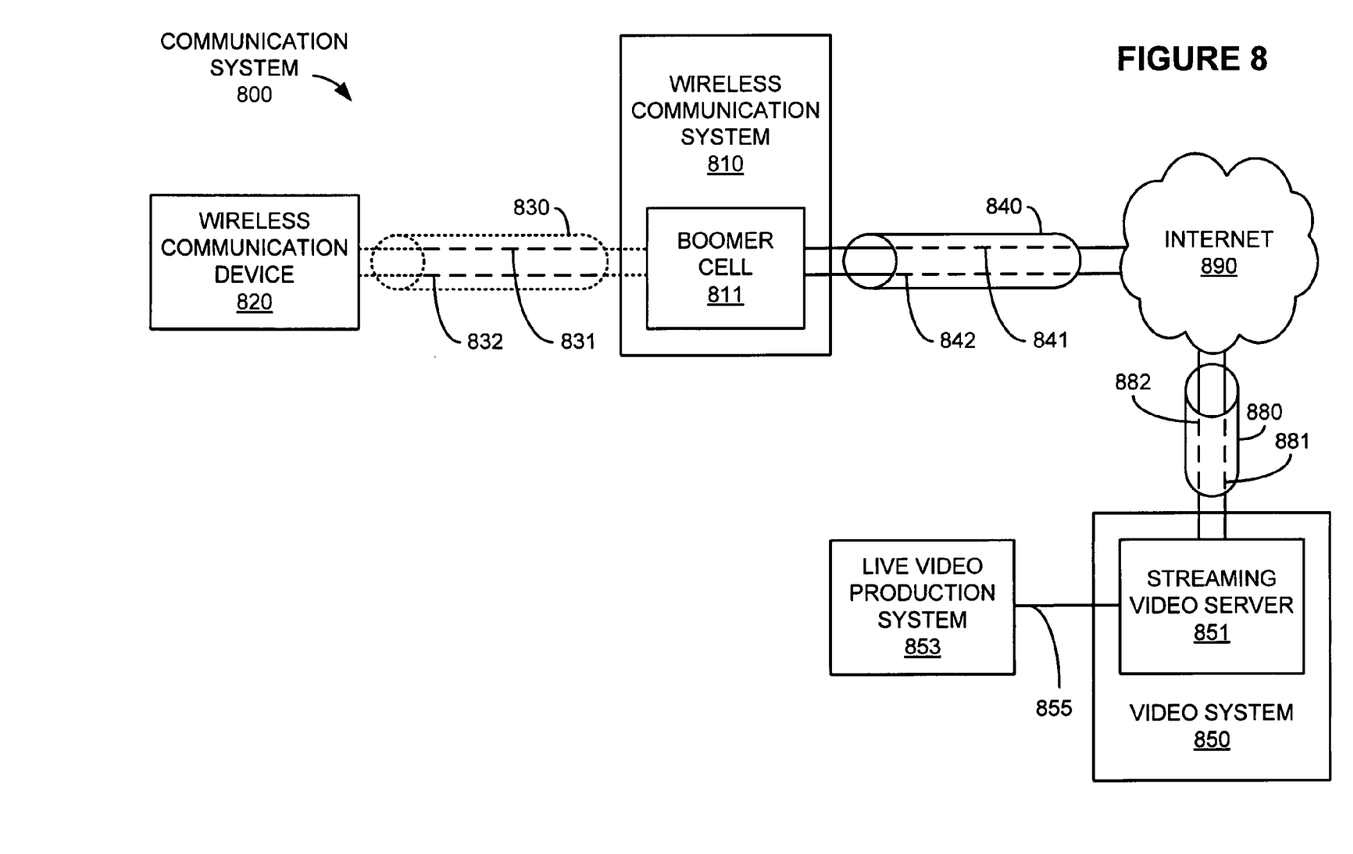
FIG. 8 is a system diagram illustrating a communication system.

FIG. 8 is a system diagram illustrating communication system 800. Communication system 800 includes wireless communication device 820, wireless communication system 810, video system 850, live video production system 853, and Internet 890. Wireless communication device 820 and wireless communication system 810 communicate over wireless link 830. Video system 850 and wireless communication system 810 communicate through Internet 890 over links 880 and 840. Wireless link 830 includes logical transport links 831-832. Link 840 includes logical transport links 841-842. Link 880 includes logical transport links 881-882.

Wireless communication device 820 comprises a wireless-enabled laptop computer capable of displaying video in this example. Wireless communication system 810 can be any type of wireless communications network equipment capable of communicating with wireless communication device 820. As shown in FIG. 8, wireless communication system 810 includes boomer cell 811. A boomer cell is an example of a base station tailored to service a high number of wireless communication devices over a large geographic area, such as a metropolitan area. In other examples, a different number of wireless communication devices and base stations may be located in communication system 800.

Video system 850 includes equipment capable of transferring or streaming video to wireless communication device 820. As shown in FIG. 8, video system 850 comprises streaming video server 851. Streaming video server 851 includes a data server and routing equipment for transferring streaming video over Internet 890 and wireless communication system 810 to wireless communication device 820. Live video production system 853 includes equipment associated with capturing, digitizing, compressing, and transferring live video from events such as sporting events or on-site news coverage. Streaming video server 851 and live video production system 853 are communicatively linked by link 855.

Link 855 comprises an IP network link between streaming video server 851 and live video production system 853. Links 840 and 880 comprise high-speed optical connections between video system 850, Internet 890, and wireless communication system 810. Wireless link 830 uses worldwide interoperability for microwave access (WiMAX) to exchange communications between wireless communication device 820 and wireless communication system 810.

Wireless link 830, link 840, and link 880 may comprise many different signals sharing the same link. As shown in FIG. 8, wireless link 830, link 840, and link 880 include several logical transport links. Wireless link 830 includes logical transport links 831-832. Link 840 includes logical transport links 841-842. Link 880 includes logical transport links 881-882. In this example, these logical transport links represent different IP socket pathways between the associated equipment.

Figure 9:
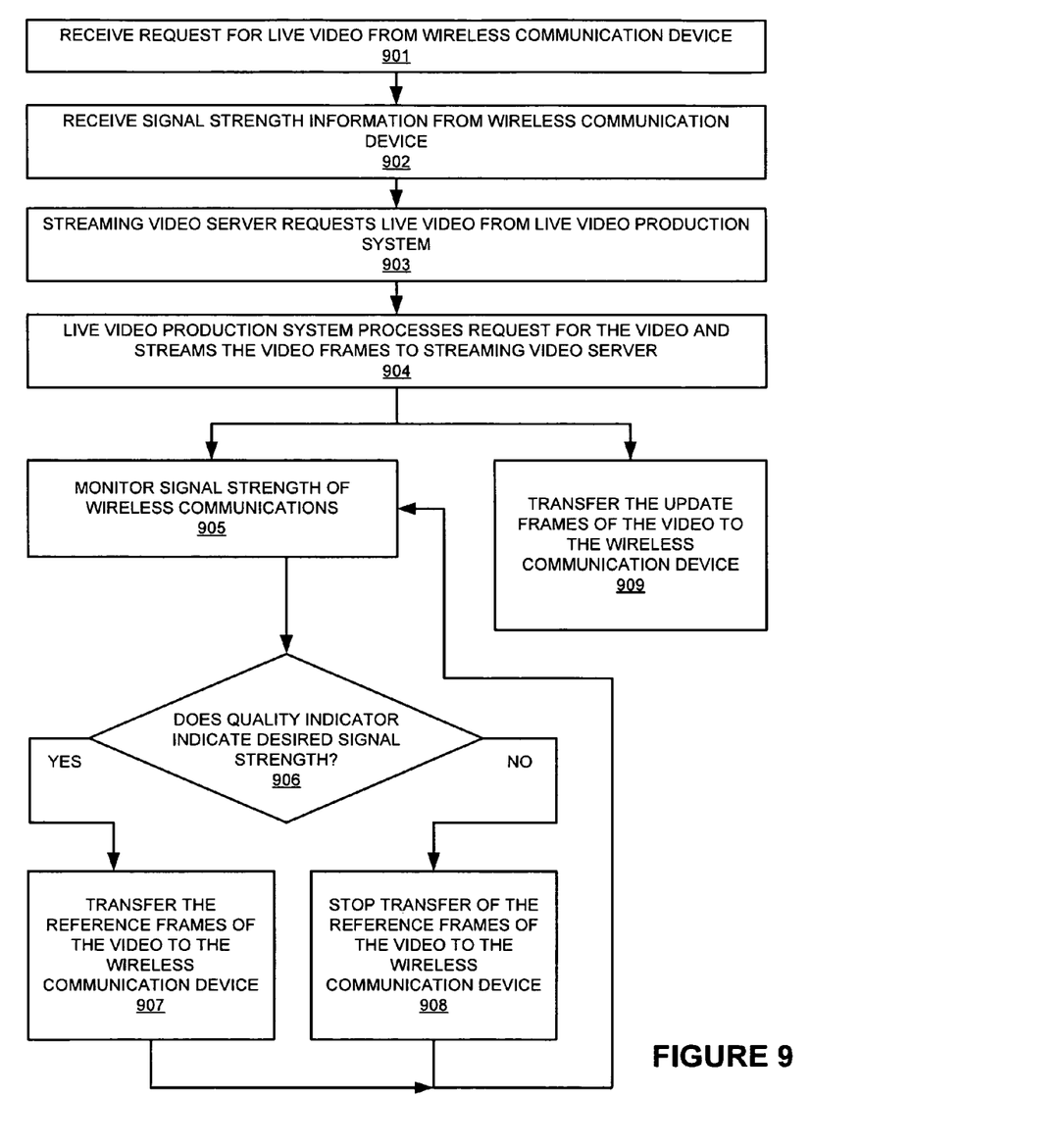
FIG. 9 is a flow diagram illustrating a method of operation of a communication system.

FIG. 9 is a flow diagram that illustrates a method of operation of communication system 800, as found in FIG. 8. The phases shown in FIG. 9 are indicated herein parenthetically. In FIG. 9, streaming video server 851 receives (801) a request for live video from wireless communication device 820.

Streaming video server 851 then requests (902) a quality indicator. In this example, streaming video server 851 requests this quality indicator from wireless communication device 820. In other examples, wireless communication device 820 provides this quality indicator with the request for video. The quality indicator indicates a quality of wireless communications between wireless communication device 820 and wireless communication system 810. In this example, the quality indicator denotes information regarding the signal strength of wireless communications over wireless link 830 as determined by wireless communication device 820.

Streaming video server 851 then requests (903) the live video, as requested by wireless communication device 820, from live video production system 853. Live video production system 853 processes (904) the request for the live video and begins to stream the frames of the live video to streaming video server 851 over link 855. Live video production system 853 could include, in this example, equipment associated with capturing, digitizing, compressing, and transferring live video. However, in other examples, live video production system 853 transfers uncompressed and possibly analog video to streaming video server 851. Streaming video server 851 could be configured to digitize and/or compress the video for transport to wireless communication device 820. In yet other examples, the video, although digitized and compressed prior to arrival in streaming video server 851, may undergo a format or compression encoding change in streaming video server 851 to place the video in a format compatible for decoding on wireless communication device 820.

Streaming video server 851 monitors (905) information regarding the signal strength of the wireless communications, as provided by wireless communication device 820. Streaming video server 851 then determines (906) if the signal strength indicates a particular signal strength. If the signal strength is at a desired level, streaming video server 851 transfers (907) reference frames of the video to wireless communication device 820 over Internet 890 and wireless communication system 810 through boomer cell 811. The reference frames are transferred over logical transport link 881 between streaming video server 851 and Internet 890, over logical transport link 841 between Internet 890 and boomer cell 811, and over logical transport link 831 between boomer cell 811 and wireless communication device 820. However, if the quality indicator does not indicate a high enough signal strength for wireless communications over wireless link 830, then streaming video server 851 stops (908) transfer of the reference frames of the video to wireless communication device 820. Since streaming video server 851 is transferring live video content in this example, a buffering system could be incorporated into streaming video server 851 to prevent the dropping or skipping of reference frames waiting to be transferred to wireless communication device 820.

Streaming video server 851, concurrently, and without regard to the quality indicator mentioned above, transfers (909) update frames of the video to wireless communication device 820. Update frames are transferred over logical transport link 882 between streaming video server 851 and Internet 890, over logical transport link 842 between Internet 890 and boomer cell 811, and over logical transport link 832 between boomer cell 811 and wireless communication device 820.

During operation of communication system 800, the process described above in phases 902 and 905-908 may be repeated throughout the transfer of a video. How frequent streaming video server 851 checks the status of the quality indicator will vary depending upon many factors, including the intentions of the operator of video system 850, the quality of video desired to be transferred, SLA concerns of wireless communication system 810, or other factors.

Advantageously, a video system configured as described herein can provide a higher quality of video service and possibly better user experience over wireless links where the quality of wireless communications can vary over time. Since, in many of the examples included herein, reference frames are transferred separately from update frames, and the reference frames are only transferred when the quality of the wireless link between a wireless communication device and a wireless communication system can support, for example a certain bandwidth, a wireless communication device can buffer up the generally smaller update frames separately from the generally larger reference frames. When the quality of the wireless link allows for transfer of the reference frames, the video server can then transfer these generally larger reference frames, making efficient use of the resources of the wireless link. Thus, the transfer of the reference frames will typically not impede the transfer of the generally smaller—and more frequent—update frames. In many examples of compressed video, many more update frames are required than reference frames for each second of video.

In a wireless communication device, the reference frames and the update frames are then re-sequenced according to a desired playback sequence and displayed. In such a manner, a compressed video can be transferred from a video server to a wireless communication device over a wireless communication system in a more efficient manner resulting in a better user experience and possibly higher frame transfer and/or playback rates of the video.

In addition to, or alternatively from the separate transfer of reference frames and update frames, other methods may be employed to make more efficient use of the changing bandwidth capabilities of a wireless link. For example, when the quality indicator mentioned above indicates a certain quality level of wireless communications between a wireless communication device and a wireless communication system, the video transferred from a video server could comprise a different format, encoding scheme, or resolution, among other changes. A video server could possibly request this different video format from a media storage system in some examples. Advantageously, by sending a lower resolution video format during periods of lower quality wireless communications, more efficient use of the available wireless bandwidth could be made while still maintaining the user experience and keeping the frame transfer rate at a desired level. In other examples, a different and possibly more lossy video compression scheme could be used during periods of lower quality wireless communication to achieve a similar effect.

FIGS. 1-9 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a video system comprising:
   in a video server, monitoring a quality indicator for wireless communications between a wireless communication system and a wireless communication device;
   in the video server, transferring reference frames of a video for delivery to the wireless communication device over the wireless communication system if the quality indicator indicates a particular quality level and stopping the transfer of the reference frames if the quality indicator does not indicate the particular quality level;
   in the video server, transferring update frames of the video for delivery to the wireless communication device over the wireless communication system without regard to whether the quality indicator indicates the particular quality level;
   in the wireless communication device, receiving the reference frames and the update frames of the video over the wireless communication system; and
   in the wireless communication device, displaying the video.

2. The method of operating the video system of claim 1, further comprising:
   in the video server, transferring the reference frames over a first logical transport link and the update frames over a second logical transport link; and in the wireless communication device, receiving the reference frames over the first logical transport link and the update frames over the second logical transport link and determining a playback sequence among the reference frames and the update frames.

3. The method of operating the video system of claim 2, wherein the first logical transport link comprises a first transportation port and the second logical transport link comprises a second transportation port.

4. The method of operating the video system of claim 1, wherein the reference frames of the video comprise MPEG I-frames and the update frames of the video comprise at least one of MPEG P-frames and MPEG B-frames.

5. The method of operating the video system of claim 1, further comprising:
   in the video server, querying a base station associated with the wireless communication device for the quality indicator;
   in the base station, receiving the query, obtaining the quality indicator, and transferring the quality indicator; and
   in the video server, receiving the quality indicator.

6. The method of operating the video system of claim 1, further comprising:
   in the wireless communication device, determining the quality indicator of the wireless communications and transferring the quality indicator;
   in the video server, receiving the quality indicator.

7. The method of operating the video system of claim 1, wherein the quality indicator indicates a signal-to-noise ratio of the wireless communications with the wireless communication device at the wireless communication system.

8. The method of operating the video system of claim 1, wherein the quality indicator indicates a signal-to-noise ratio of the wireless communications with the wireless communication system at the wireless communication device.

9. The method of operating the video system of claim 1, wherein the quality indicator comprises an RF quality of the wireless communications and the particular quality level comprises a threshold level of an RF quality of the wireless communications, and
   in the video server, stopping the transfer of the reference frames of the video if the quality indicator falls below the threshold level.

10. The method of operating the video system of claim 1, wherein the quality indicator comprises a present bandwidth of the wireless communications and the particular quality level comprises a threshold bandwidth level of the wireless communications, and
   in the video server, stopping the transfer of the reference frames of the video if the quality indicator falls below the threshold level.

11. A method of operating a video system, comprising:
   in a video server, receiving a request for a video from a wireless communication device over a wireless communication system;
   in the video server, requesting a quality indicator from a base station associated with the wireless communication device, wherein the quality indicator indicates a quality of wireless communications between the wireless communication device and the wireless communication system;
   in the video server, requesting the video from a media storage system;
   in the media storage system, processing the request for the video and transferring the video to the video server;
   in the video server, monitoring the quality indicator and transferring reference frames of the video for delivery to the wireless communication device over the wireless communication system if the quality indicator indicates a particular quality level and stopping the transfer of the reference frames if the quality indicator does not indicate the particular quality level;
   in the video server, transferring update frames of the video for delivery to the wireless communication device over the wireless communication system without regard to whether the quality indicator indicates the particular quality level.

12. The method of operating the video system of claim 11, further comprising:
   in the video server, transferring the reference frames of the video over a first logical transport link and the update frames of the video over a second logical transport link; and
   in the wireless communication device, receiving the reference frames of the video over the first logical transport link and the update frames of the video over the second logical transport link and determining a playback sequence among the reference frames of the video and the update frames of the video.

13. The method of operating the video system of claim 12, wherein the first logical transport link comprises a first transportation port of the wireless communication device and the second logical transport link comprises a second transportation port of the wireless communication device.

14. The method of operating the video system of claim 11, wherein the reference frames of the video comprise MPEG I-frames and the update frames of the video comprise at least one of MPEG P-frames and MPEG B-frames.

15. The method of operating the video system of claim 11, wherein the quality indicator indicates a signal-to-noise ratio of the wireless communications with the wireless communication device.

16. The method of operating the video system of claim 11, wherein the quality indicator comprises a present bandwidth of the wireless communications and the particular quality level comprises a threshold bandwidth level of the wireless communications, and
   in the video server, stopping the transfer of the reference frames of the video if the quality indicator falls below the threshold level.

17. The method of operating the video system of claim 11, wherein the quality indicator comprises an RF quality of the wireless communications and the particular quality level comprises a threshold level of an RF quality of the wireless communications, and
   in the video server, stopping the transfer of the reference frames of the video if the quality indicator falls below the threshold level.

18. A communication system comprising:
   a wireless communication device and a wireless communication system configured to exchange wireless communications;
   the wireless communication system configured to receive a request from the wireless communication device for a video, and transfer the request for the video to a video server;
   the video server configured to receive the request for the video;
   the video server configured to monitor a quality indicator of the wireless communications and transfer reference frames of the video for delivery to the wireless communication device over the wireless communication system if the quality indicator indicates a particular quality level and stop the transfer of the reference frames if the quality indicator does not indicate the particular quality level;
the video server configured to transfer update frames of the video for delivery to the wireless communication device over the wireless communication system without regard to whether the quality indicator indicates the particular quality level;
the wireless communication device configured to receive the video, process the reference frames and the update frames to determine a playback sequence of the video, and display the video in the playback sequence.

* * * * *